United States Patent
Dykstra

(10) Patent No.: US 12,295,356 B2
(45) Date of Patent: May 13, 2025

(54) AUTOMATIC FAUCET FOR ANIMALS

(71) Applicant: James Dykstra, Urbandale, IA (US)

(72) Inventor: James Dykstra, Urbandale, IA (US)

( * ) Notice: Subject to any disclaimer, the term of this patent is extended or adjusted under 35 U.S.C. 154(b) by 0 days.

(21) Appl. No.: 17/754,692

(22) PCT Filed: Jan. 7, 2021

(86) PCT No.: PCT/US2021/012433
§ 371 (c)(1),
(2) Date: Apr. 8, 2022

(87) PCT Pub. No.: WO2021/142071
PCT Pub. Date: Jul. 15, 2021

(65) Prior Publication Data
US 2024/0081285 A1    Mar. 14, 2024

Related U.S. Application Data

(60) Provisional application No. 62/958,504, filed on Jan. 8, 2020.

(51) Int. Cl.
| | |
|---|---|
| *A01K 7/06* | (2006.01) |
| *E03C 1/05* | (2006.01) |
| *F16K 31/02* | (2006.01) |
| *F16K 31/60* | (2006.01) |
| *G05D 7/06* | (2006.01) |

(52) U.S. Cl.
CPC ............... *A01K 7/06* (2013.01); *E03C 1/057* (2013.01); *F16K 31/02* (2013.01); *F16K 31/60* (2013.01); *G05D 7/0617* (2013.01); *Y10T 137/87877* (2015.04); *Y10T 137/9464* (2015.04)

(58) Field of Classification Search
None
See application file for complete search history.

(56) References Cited

U.S. PATENT DOCUMENTS

| | | | | |
|---|---|---|---|---|
| 4,839,039 A * | 6/1989 | Parsons | ................ | A47K 5/1217 210/143 |
| 5,694,653 A * | 12/1997 | Harald | .................... | E03C 1/057 4/678 |
| 6,202,594 B1 * | 3/2001 | Kirschner | ................ | A01K 7/02 119/72 |

(Continued)

OTHER PUBLICATIONS

International Searching Authority in connection with PCT/US2021/012433 filed Jan. 7, 2021, "The International Search Report and the Written Opinion of the International Searching Authority, or the Declaration", 15 pages, mailed Mar. 25, 2021.

*Primary Examiner* — Matthew W Jellett
(74) *Attorney, Agent, or Firm* — McKee, Voorhees & Sease, PLC

(57) ABSTRACT

A water faucet detects proximity of a nearby pet and/or other tame animals via motion, heat, light, or the like, and triggers or otherwise activates a powered valve which controls the flow of water through the faucet. Water through the valve is set to low flow. A training/on/off switch is provided to facilitate training of the nearby pet and/or other tame animals. The valve can include an adjustable timer for variable, timed water flow. Also included in the valve can be a T-type union with service shut off for access to an already existing water supply line. For hydration, the faucet dispenses water to the nearby pet and/or other tame animals for a finite time.

10 Claims, 5 Drawing Sheets

(56) References Cited

U.S. PATENT DOCUMENTS

| | | | |
|---|---|---|---|
| 6,388,609 B2 | 5/2002 | Paese et al. | |
| 7,228,874 B2 * | 6/2007 | Bolderheij | E03C 1/055 |
| | | | 222/145.5 |
| 7,464,418 B2 * | 12/2008 | Seggio | E03C 1/05 |
| | | | 251/129.04 |
| 8,973,612 B2 * | 3/2015 | Sawaski | E03C 1/055 |
| | | | 137/1 |
| 9,164,518 B2 | 10/2015 | Houghton | |
| 9,247,714 B1 | 2/2016 | Tait | |
| 9,695,580 B2 | 7/2017 | Esche et al. | |
| 9,777,468 B2 * | 10/2017 | Burgo, Sr. | A47K 5/12 |
| 9,816,257 B2 | 11/2017 | Blake et al. | |
| 9,840,832 B2 | 12/2017 | Seggio et al. | |
| 9,920,508 B2 | 3/2018 | Chen | |
| 9,924,701 B1 | 3/2018 | Chalmers | |
| 10,052,282 B2 | 8/2018 | Baskins | |
| 10,072,403 B2 | 9/2018 | Shirai et al. | |
| 10,273,669 B2 | 4/2019 | Esche et al. | |
| 10,287,760 B2 | 5/2019 | Sawaski et al. | |
| 10,385,555 B2 * | 8/2019 | Braddock | E03C 1/057 |
| 10,392,787 B2 | 8/2019 | Kamata et al. | |
| 10,428,498 B1 * | 10/2019 | Montague | E03C 1/057 |
| 10,489,038 B2 | 11/2019 | Klicpera | |
| 10,508,423 B2 | 12/2019 | Herbert et al. | |
| 10,557,254 B2 * | 2/2020 | Song | E03C 1/057 |
| 10,753,489 B2 * | 8/2020 | Hatakeyama | E03C 1/057 |
| 11,047,119 B2 * | 6/2021 | Gallob | G05D 23/13 |
| 11,299,876 B2 * | 4/2022 | Polly | E03C 1/0404 |
| 2007/0011806 A1 | 1/2007 | Knowlton | |
| 2007/0246550 A1 | 10/2007 | Rodenbeck et al. | |
| 2008/0202438 A1 | 8/2008 | Engel et al. | |
| 2010/0139790 A1 * | 6/2010 | Jockusch | F16K 21/04 |
| | | | 137/560 |
| 2016/0129464 A1 | 5/2016 | Frommer | |
| 2017/0258039 A1 * | 9/2017 | Lauterbach | A01K 7/06 |
| 2022/0298764 A1 * | 9/2022 | Burgo, Sr. | E03C 1/046 |

* cited by examiner

AUTOMATIC FAUCET FOR ANIMALS

CROSS REFERENCE TO RELATED APPLICATIONS

This is a U.S. National Phase application claiming priority to PCT/US2021/012433, filed 7 Jan. 2021, which application claims benefit of provisional patent application, U.S. Ser. No. 62/958,504, filed 8 Jan. 2020. The provisional patent application is herein incorporated by reference in its entirety, including without limitation, the specification, claims, and abstract, as well as any figures, tables, appendices, or drawings thereof.

FIELD OF THE INVENTION

The present invention relates generally to an apparatus and corresponding method for delivering water. More particularly, but not exclusively, the present invention relates to an automatic faucet which senses the presence of an animal for providing the animal with water.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Pet care products around help support a global pet industry worth more than 200 billion United States dollars. Said industry is quickly growing due to the increasing inclusion of pets within the family dynamic. For example, the cat population in the United States is currently estimated to be more than 100 million. The worth of the industry is largely driven by consumable food products. A new pet owner's first thought often pertains to how much to budget for the pet's food and water.

Cats typically need between 3.5 and 4.5 ounces of water per 5 pounds of body weight a day. Cats are capable of self-regulating this water intake, if given access to water. Cats instinctually drink moving water. Drinking fresher, moving water helps increase water intake and reduces the risk of urinary tract infections, idiopathic cystitis, and hairballs. Bowled water can become stale, dirty, and contaminated if the water is not frequently changed and the bowl is not properly cleaned.

Thus, there exists a need in the art for an apparatus which automatically dispenses water to domesticated animals, such as cats, while reducing water waste and usage by limiting water flow.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is still yet a further object, feature, and/or advantage of the present invention to better hydrate domesticated animals. For example, domesticated animals can maintain access to fresh water while owners are away from the domicile.

It is still yet a further object, feature, and/or advantage of the present invention to provide an automatic faucet that may be used in a wide variety of applications. For example, the faucet system can be used in connection with (i) felines, (ii) canines, (iii) lupines, (iv) vulpines, (v) bovines, (vi) porcines, (vii) ovines, (vii) caprines, (ix) equines, and (x) murines.

It is still yet a further object, feature, and/or advantage of the present invention to provide a cleaner environment for persons and domesticated animals living within the domicile. For example, odors associated with plastic or metal bowls and/or waste from domesticated animals can be eliminated through the use of porcelain sinks and/or garbage disposals.

It is still yet a further object, feature, and/or advantage of the present invention to eliminate water spills and floor damage.

It is still yet a further object, feature, and/or advantage of the present invention to provide a safe, cost effective, and durable automatic faucet.

It is still yet a further object, feature, and/or advantage of the present invention to provide an automatic faucet having a distinct aesthetic appearance.

It is still yet a further object, feature, and/or advantage of the present invention to practice methods which facilitate use, manufacture, quick installation, low maintenance, and repair of an automatic faucet accomplishing some or all of the previously stated objectives.

It is still yet a further object, feature, and/or advantage of the present invention to incorporate an automatic faucet into a faucet system accomplishing some or all of the previously stated objectives.

According to some aspects of the present disclosure, a method for delivering water comprises luring a non-human animal towards a faucet, detecting a presence of the non-human animal, providing a flow of water from the faucet to the animal for a duration of time, and regulating the flow of water with a low flow valve.

According to some additional aspects of the present disclosure, the method can also comprise manually setting a finite period of time in which the water is dispensed; adjusting a flow rate of water dispensed from the faucet; incrementally decreasing the flow rate until the duration of time elapses and flow rate of water dispensed from the faucet reaches zero; selecting the flow rate based on an identification of the non-human animal; dispensing water into a drain shared by the (auxiliary) faucet and another primary faucet; fluidly and parallelly connecting the auxiliary faucet and the primary faucet; installing, as a fixture, the auxiliary faucet within a sink assembly comprising the primary faucet; training the non-human animal to travel to the faucet when the non-human animal is thirsty; initially teaching the non-human animal to travel to the faucet in response to a verbal command and manually turning the faucet on once the non-human animal arrives at the faucet; and/or using light, sound, heat, and/or food to lure the non-human animal towards the faucet.

According to some other aspects of the present disclosure, a faucet system comprises a faucet, a low flow valve controlling a flow of water through the faucet, and a detector for detecting the presence of a non-human animal. The detector senses the presence of an animal via (a) motion, (b) light, (c) sound, (d) heat, and/or (e) a biological or chemical substance.

According to some additional aspects of the present disclosure, the faucet system can further comprise a manual shut off; at least one input device; at least one output device; a touch-screen display, which can serve as both an input and an output device, for communicating information related to at least one water characteristic; and a timer.

According to some other aspects of the present disclosure, non-transitory computer readable media and/or programmatic modules can be provided to help regulate the flow of water. The non-transitory computer readable medium can comprise a memory, an operating system, a compiler, and executable software programs. A transmitter, in combination with the non-transitory computer readable medium, can be used to communicate data related to the at least one water characteristic to remote computer system(s).

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

An artisan of ordinary skill need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
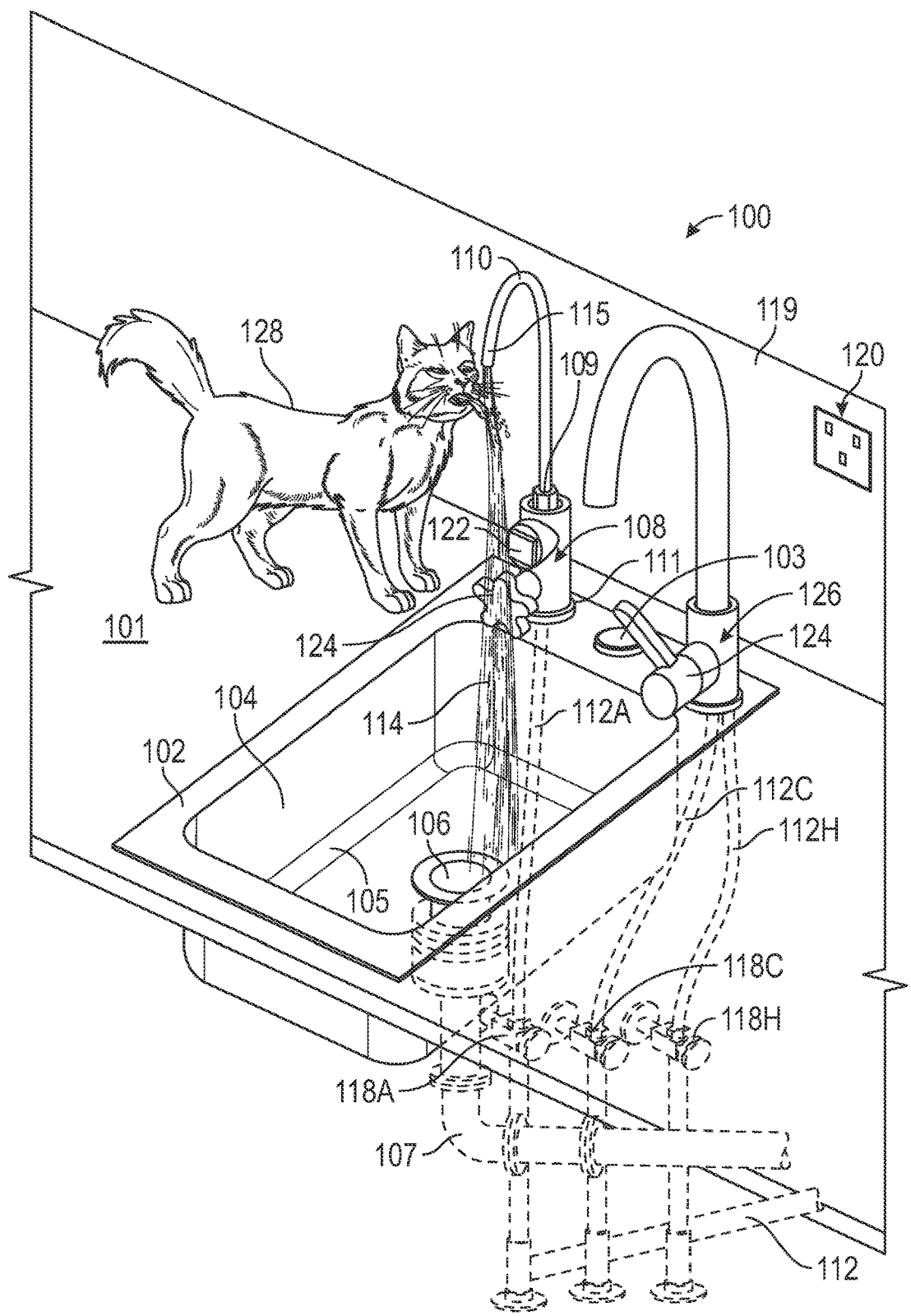
FIG. 1 shows a perspective view of a faucet system which includes an automatic (auxiliary) faucet for animals (e.g. felines) and a separate (primary) faucet for humans, according to some aspects of the present disclosure.

FIG. 1 illustrates a faucet system 100 for automatically delivering water. The faucet system 100 shown comprises a sink 102. The sink 102 can optionally be built into a countertop 101, include a backsplash 119, and/or can be of the standalone variety. The sink 102 comprises a basin 104 for retaining water. Water collected in the basin 104 of the sink 102 (e.g., a porcelain sink), and through gravity falls downward along a sloped gradient 105 and empties into a drain 106. The gradient 105 can be bowl shaped or can be a very shallow slope. In a preferred embodiment, the sink 102 comprises additional sink components, such as: supply lines 112, including auxiliary 112A, cold 112C, and 112H supply lines, which may or may not be shared by more than one faucet; corresponding manual shut off(s) 118, 118A, 118C, and 118H for the supply lines; a stopper and/or gasket 103 for plugging the drain 106; pipes and/or sewer lines 107 in fluid communication with the drain 106, said pipes typically including T-connectors 113, L-connectors, and/or elbows; a trap; means for inspecting the pipes; coupling nuts, threaded connection(s), and/or other means for securing said pipes; a garbage disposal; a dish washer drain hose in fluidly connected to a dish washer; and the like.

An auxiliary faucet 108 with a low flow valve 116 controls a flow of water 114, which enters the auxiliary faucet at a fluid inlet 109 connected to one or more of the supply lines 112. A sensor 122 for detects the presence of a non-human animal 128. Detection of the presence of the non-human animal 128 will cause a flow of water 114 to enter the spout 110, and through enough fluid pressure travel upward until the water 114 automatically exits the auxiliary faucet 108 at a fluid outlet 115. The spout 110 can be of any particular length, height, shape, and/or configuration to best mitigate the opportunity for inadvertent splashing of water on surfaces other than the sink basin 104. The flow of water 114 can then, for example, be consumed by a non-human animal or enter the sink 102. The low flow valve 116 can be located within the spout 110 of the faucet, below a surface of the sink 102, below the sink basin 104, or in any other suitable location. The auxiliary faucet 108 can be held in place via mounting bracket 111, fasteners and other means for fastening 111F, and/or by way of push/friction fit with portions of the countertop 101 or sink 102. To that end, the mounting bracket 111 may protrude from the surface of the countertop 101 or be flush therewith. The mounting bracket 111 may include an escutcheon to improve aesthetic appearance of the sink 102.

Figure 2:
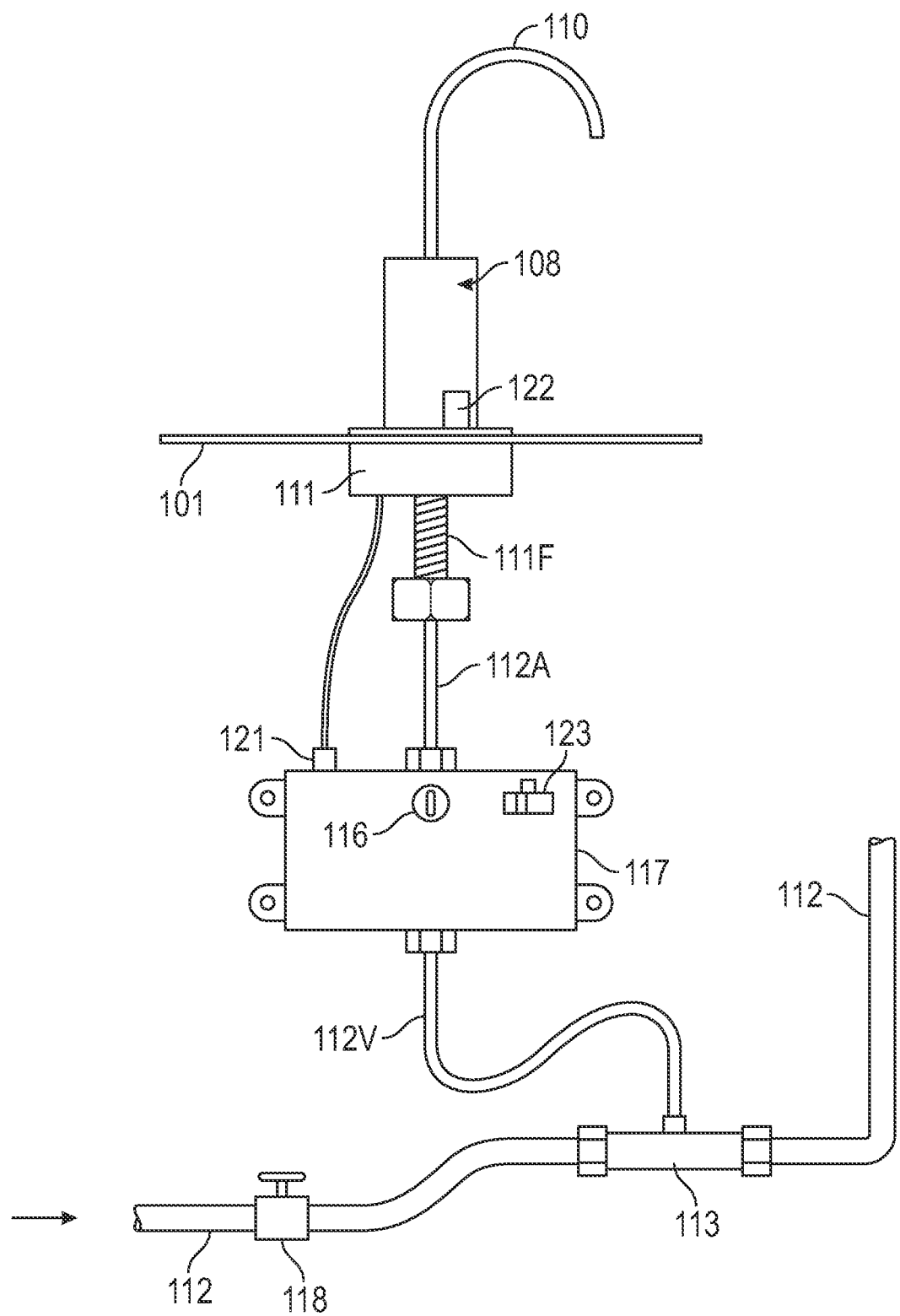
FIG. 2 shows a schematic view of mechanical, electrical, and fluid connections of the overall system as they relate to the flow control.

An example of a low flow valve 116 is seen with more specificity in FIG. 2, is controlled at least in part by proximity sensor 122, and includes: a flow control that is housed within valve housing 117, wire connect 121, and a time switch 123 or timer. The particular low flow valve 116 used is not to be limited to a particular make, model, or configuration. Rather, it is to be understood the low flow valve 116 can either comprise or implement a similar operating principle to ball valves, butterfly valves, choke valves, gate valves, globe valves, knife valves, needle valves, pinch valves, piston valves, plug valves, solenoid valves, and/or spool valves. The low flow 116 can, but is not limited to, allowing fluid to pass in one direction only, maintaining and controlling a variable flow rate through the valve, mix gas(es) with liquid(s), regulate pressure, temperature, and/or duration of dispensement of fluids, prevent dangerous situations, etc. The flow of water 114 can be increased and/or decreased via any permissible input means 124A for the valve 116, such as a knob, touch-screen, or the like. Said input means can even include a remote control that can engage the time switch 123 and/or a timer.

Figure 3:
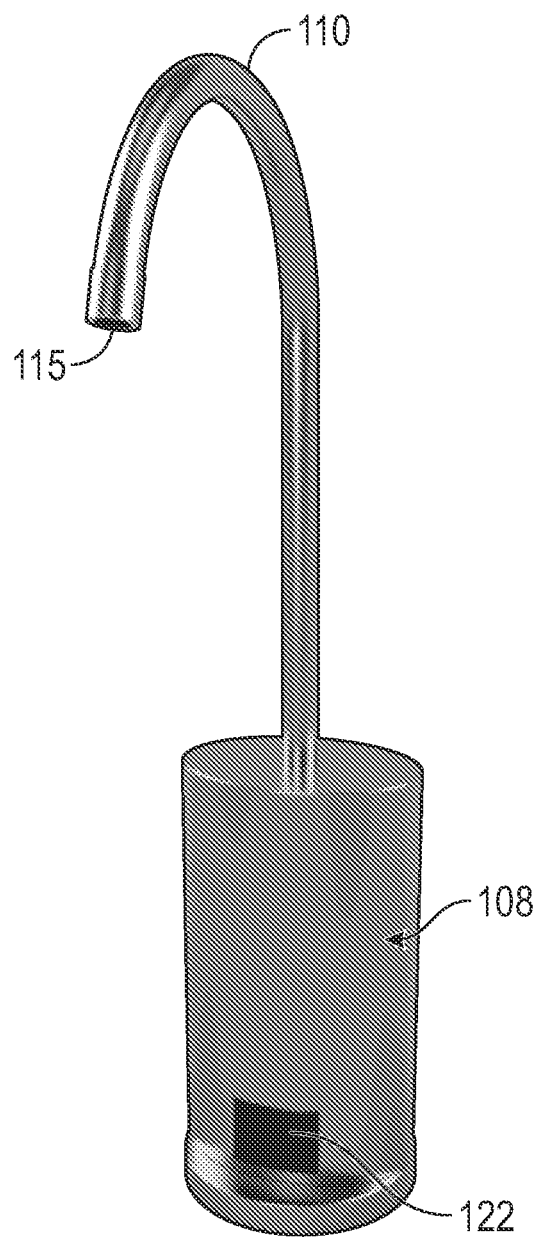
FIG. 3 shows a partial rendering of an alternative auxiliary faucet.
Figure 4:
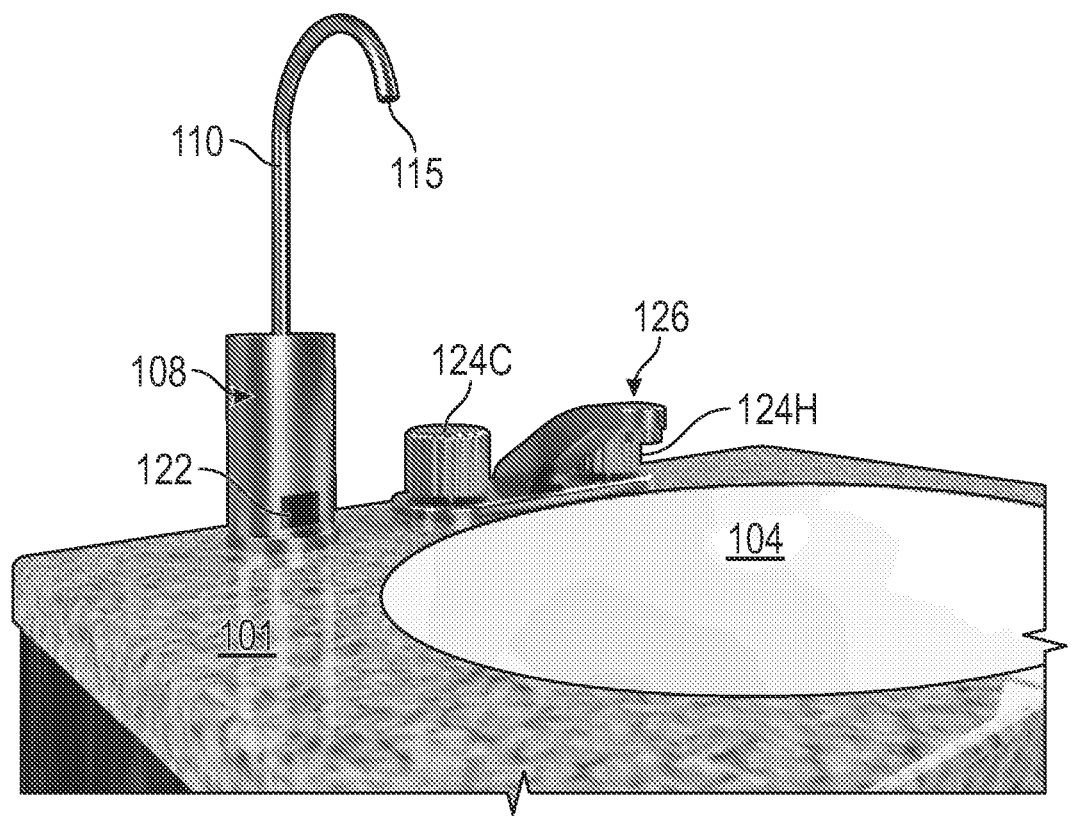
FIG. 4 shows a partial rendering of the alternative auxiliary faucet in an exemplary system for a bathroom.

The proximity sensor 122 can be any sensor capable of detecting the presence of a non-human animal and can rely upon the detection of (a) motion, (b) light, (c) sound, (d) heat, and/or (e) a biological or chemical substance. An example proximity sensor 122 can be seen in some detail by way of the partially rendered views shown in FIGS. 3-4.

The valve 116 and/or sensor 122 can be powered by any suitable power supply 120, and preferably one which is in close physical proximity to the same. The power supply outputs a particular voltage to a device or component or components of a device. The power supply could be a direct current ("DC") power supply (e.g., a battery), an alternating current ("AC") power supply (e.g., the electrical outlet shown in FIG. 1), a linear regulator, etc. The power supply can be configured with a microcontroller to receive power from other grid-independent power sources, such as a generator or solar panel. With respect to batteries, a dry cell battery may be used. Additionally, the battery may be rechargeable, such as a lead-acid battery, a low self-discharge nickel metal hydride battery ("LSD-NiMH") battery, a nickel—cadmium battery ("NiCd"), a lithium-ion battery, or a lithium-ion polymer ("LiPo") battery. Careful attention should be taken if using a lithium-ion battery or a LiPo battery to avoid the risk of unexpected ignition from the heat generated by the battery. While such incidents are rare, they can be minimized via appropriate design, installation, procedures and layers of safeguards such that the risk is acceptable.

As shown in FIG. 2, water can be acquired from the existing water line 118 running to the main faucet 126. From the water shut off valve 118 a t-valve in T-connector 123 can be put in place to divert water to the auxiliary faucet 108, thereby keeping water access to the main faucet 126 unobstructed, and so that the main faucet 126 and auxiliary faucet 108 can operate independently from each other.

Figure 5:
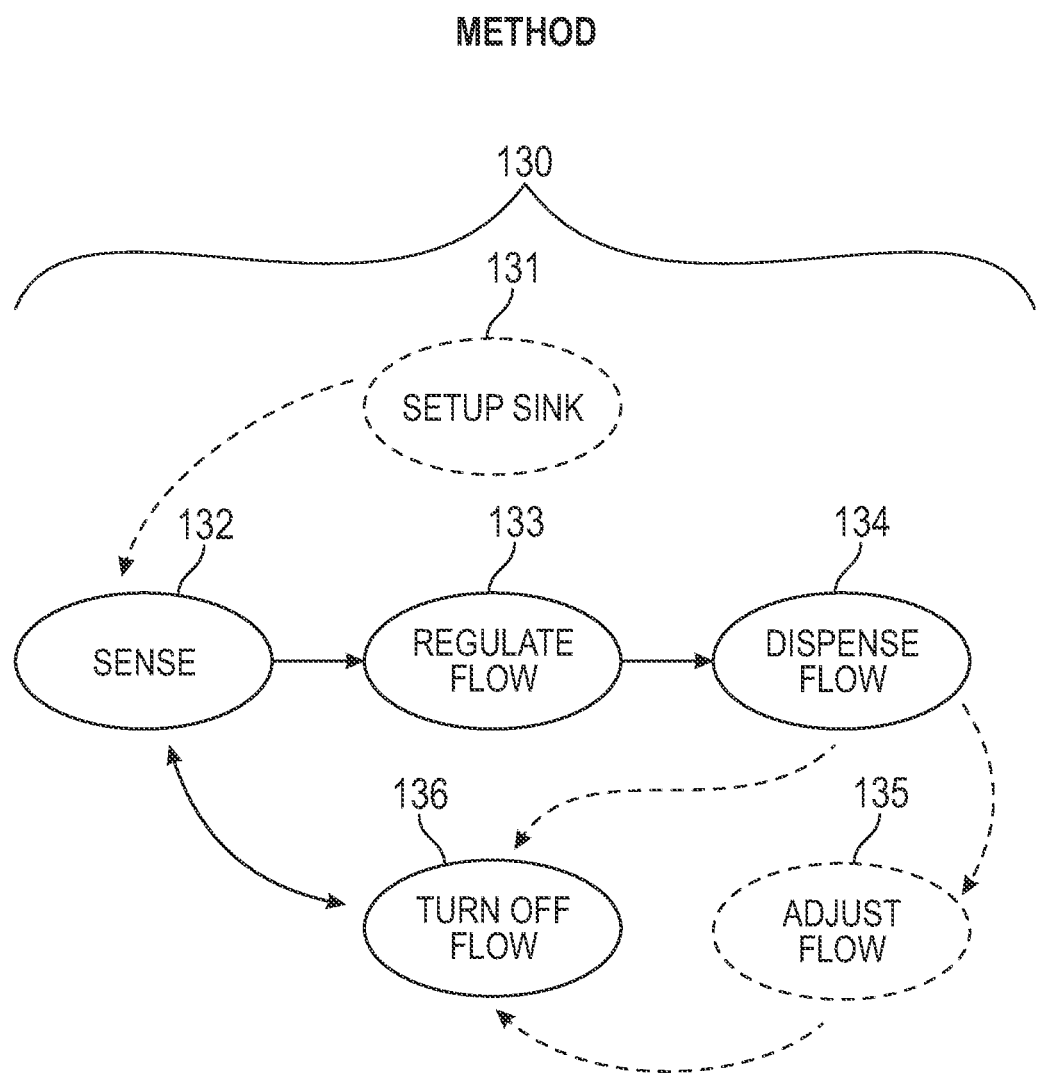
FIG. 5 shows a flow chart illustrating use of the faucet system of FIG. 1, according to some aspects of the present disclosure.

FIG. 5 exemplifies a potential method of use 130 of the faucet system 100, according to some aspects of the present disclosure. For example, to setup 131 the system, water under pressure must be allowed to enter the valve 116. As motion is sensed 132 by proximity sensor 122, the control valve 116 opens allowing water to flow. The control value 116 meters and/or regulates 133 the amount of water dispensed 134 through mechanical or electrical valves. The control portion of the valve 116 uses information from the sensor to turn on water flow. This can also be adapted to control and/or adjust 135 the flow rate also. Proximity sensor 122 is located in base of the auxiliary faucet 108. The proximity sensor 122 can use infrared, motion, or other proximity means to send a signal to the control value 116 via a wire harness or wireless methods. After a certain time and/or when proximity of an animal is no longer sensed, the water will automatically turn of via timer switch 123. The water flow through the system will then be in "idle" until proximity of an animal is again sensed and the steps are repeated. The system can thus be considered to be closed loop with respect to steps 132-136.

In other words, water can be automatically delivered to a non-human animal 128 for a temporary time upon automatic detection of the same. The non-human animal 128 can, for example, be one selected from the group consisting of a (i) feline, (ii) canine, (iii) lupine, (iv) vulpine, (v) bovine, (vi) porcine, (vii) ovine, (vii) caprine, (ix) equine, and (x) murine. The non-human animal 128 can be lured (e.g. by training the non-human animal 128, using light, sound, heat, and/or food to lure the non-human animal 128 towards the faucet 108, and/or the like) to a location of the auxiliary faucet 108, which can be indoors or outdoors, and positioned based on the type of non-human animal and/or proximity to another faucet 126 dedicated to providing water to humans. The primary faucet 126 can have similar, distinct, identical, and/shared components (fluid inlet, fluid outlet, escutcheon, etc.) to that of the auxiliary faucet 108. That said, the primary faucet 126 will preferably have its own input means, such as the hot and cold knobs 124C, 12411 shown in the partially rendered views of FIGS. 3-4.

A flow of water 114 is regulated by the low flow valve 116 and thus provided to the non-human animal for the temporary time, by the temporary time and level of flow being adjustable by a user. For example, the duration of time can be manually set. In another example, the flow rate can be incrementally decreased until the duration of time elapses and the flow rate reaches zero. In yet another example, the flow rate may be adjusted depending on the type of non-human animal 128.

After the temporary time the flow of water 114 will cease in order to conserve water and the sensor 122 will again wait to sense proximity of an animal.

Supply lines and/or fluid connections between the auxiliary faucet 108 and the primary faucet 126 can be in series, in parallel, or a combination thereof. The auxiliary faucet 108 can be permanently installed as a fixture the auxiliary faucet 108 within a sink 102 comprising the primary faucet 126.

It is to be appreciated the method of use 130 may be carried out, either in whole or in part, by computer(s) and/or other automated input and output devices. For example, an exemplary hardware environment usable in connection with the faucet system 100 can include at least one non-transitory computer readable medium that works in connection with the automatic sensors 122.

According to some aspects of the disclosure, a non-transitory readable medium is electrically, magnetically, mechanically, or otherwise connected to the sensors 122 and/or the valve 116 such that data may be communicated therebetween. The non-transitory computer readable medium can comprise an intelligent control unit, a memory, an operating system, a compiler, programmatic modules, a user interface including input and output device(s), and communication components capable of employing communication protocols (e.g. transmitters and/or receivers) to connect to a network. The user output device, for example, could be a display for communicating information related to at least one water characteristic. The display can also act as an input means to the computerized system, for example if the display is a touch-screen display. Said water characteristics can even be communicated remotely to other computerized component(s) if the non-transitory computer readable medium includes a transmitter for communicating data.

The non-transitory computer readable medium and any programmatic modules contained therein could thus act as the primary means for which the functions and/or steps of the present disclosure may be practiced by person(s) who interface with the non-transitory computer readable medium. Such persons could, for example, monitor water data, set desired flow rates for the valve 116, set a timer, etc. The non-transitory computer readable medium can have access to database(s) which store faucet system data, owner or domicile data, and/or other types of data. Stored data may be updated periodically, in real time, or in response to an input received from persons or animals using the faucet system 100.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

List of Reference Characters

| | |
|---|---|
| 100 | faucet system |
| 101 | counter top |
| 102 | sink |
| 103 | plug |
| 104 | basin |
| 105 | gradient |
| 106 | drain |
| 107 | sewer line |
| 108 | auxiliary faucet |
| 109 | fluid inlet |
| 110 | spout |
| 111 | mounting bracket |
| 111F | means for fastening mounting bracket |
| 112 | main water supply line |
| 112A | auxiliary water supply line |
| 112C | cold water supply line |
| 112H | hot water supply line |
| 113 | T-connection |
| 114 | water |
| 115 | fluid outlet |
| 116 | flow control |
| 117 | valve housing |
| 118 | main water shut off |
| 118A | auxiliary water shut off |
| 118C | cold water shut off |
| 118H | hot water shut off |
| 119 | backsplash |
| 120 | external power supply |
| 121 | sensor wire connect |
| 122 | proximity sensor |
| 123 | time switch |
| 124 | input device |
| 126 | primary faucet |
| 128 | domesticated animal |
| 130 | method of use |
| 131 | initiation |
| 132 | sensing step |
| 133 | control step |
| 134 | dispensing step |
| 135 | adjusting step |
| 136 | return to idle |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

In communications and computing, a computer readable medium is a medium capable of storing data in a format readable by a mechanical device. The term "non-transitory" is used herein to refer to computer readable media ("CRM") that store data for short periods or in the presence of power such as a memory device or random access memory ("RAM").

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

As used herein, an intelligent control unit is an electronic circuit which performs operations on some external data source, usually memory or some other data stream. Non-limiting examples of intelligent control units include central processing units ("CPUs"), microprocessors, microcontrollers, arithmetic logic units ("ALUs"), components implemented partially or entirely on a semiconductor chip (e.g., a field-programmable gate array ("FPGA")), and other computing devices capable of allowing input, providing options, and showing output of electronic functions. The electronic circuitry within a computer will carry out the instructions of a computer program by performing the basic arithmetic, logic, controlling, and input/output ("I/O") operations specified by the instructions. Intelligent control units are common in tablets, telephones, handheld devices, laptops, user displays, and other computing devices capable of allowing input, providing options, and showing output of electronic functions.

"Memory" will include, at least in some embodiments, a program storage area and a data storage area. Common types of memory include read-only memory ("ROM", an example of non-volatile memory, meaning it does not lose data when it is not connected to a power source) or random access memory ("RAM", an example of volatile memory, meaning it will lose its data when not connected to a power source).

Generally, a non-transitory computer readable medium will operate under control of an operating system stored in the memory. The non-transitory computer readable medium implements a compiler which allows a software application written in a programming language such as COBOL, C++, FORTRAN, or any other known programming language to be translated into code readable by the central processing unit. After completion, the software application accesses and manipulates data stored in the memory of the non-transitory computer readable medium using the relationships and logic that was generated using the compiler.

In some embodiments, software application(s) and the compiler are tangibly embodied in the computer-readable medium. When the instructions are read and executed by the non-transitory computer readable medium, the non-transitory computer readable medium performs the steps necessary to implement and/or use the present invention. A software application, operating instructions, and/or firmware (semi-permanent software programmed into read-only memory) may also be tangibly embodied in the memory and/or data communication devices, thereby making the software application a product or article of manufacture according to the present invention.

A database is a structured set of data typically held in a computer. The database, as well as data and information contained therein, need not reside in a single physical or electronic location. For example, the database may reside, at least in part, on a local storage device, in an external hard drive, on a database server connected to a network, on a cloud-based storage system, in a distributed ledger (such as those commonly used with blockchain technology), or the like.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A method for delivering water comprising:
   utilizing a faucet system comprising:
     a sink comprising a countertop and a sink basin;
     a primary faucet;
     an auxiliary faucet, wherein the auxiliary faucet and the primary faucet are configured to dispense water into a shared drain;
     a low flow valve located within a valve housing that is below the countertop;
     a sensor located above the countertop, wherein the sensor is mounted to a mounting bracket; and
     a display for communicating information related to at least one water characteristic, wherein the display comprises at least one touch-sensitive input device;
   luring a non-human animal towards the auxiliary faucet using light, sound, heat, and/or food;
   triggering the sensor with a change in (a) motion, (b) light, (c) sound, (d) heat, and/or (e) a biological or chemical substance;
   providing, with a water supply line, a flow of water from at least one upstream location that is below the sink basin to the auxiliary faucet, wherein the water supply line splits three ways into an auxiliary water supply line, a hot water supply line, and a cold water supply line, and such that the water supply line parallelly and fluidly connects to the primary faucet and the auxiliary faucet, wherein the mounting bracket further fastens to the auxiliary water supply line by way of a fastener;
   transporting the flow of water to the auxiliary faucet so that the flow of water can further be delivered to the non-human animal for a duration of time controlled by a time switch operatively attached to the valve housing;
   transporting power through a wire that extends through the mounting bracket between the low flow valve and the sensor;
   regulating the flow of water through the auxiliary faucet with the low flow valve;
   adjusting a flow rate of the water dispensed from the auxiliary faucet; and
   retaining an ability to dispense water from the primary faucet;
   wherein said auxiliary faucet and said primary faucet attach separately to the countertop of the faucet system and stand alone with respect to one another;
   wherein adjusting comprises incrementally decreasing the flow rate until the duration of time elapses and the flow rate reaches zero.

2. The method of claim 1 further comprising manually setting the duration of time.

3. The method of claim 1 wherein said adjusting comprises selecting the flow rate based on an identification of the non-human animal.

4. The method of claim 1 further comprising installing, as a fixture, the auxiliary faucet within a sink comprising the primary faucet.

5. The method of claim 1 wherein the non-human animal is selected from the group consisting of a (i) feline, (ii) canine, (iii) lupine, (iv) vulpine, (v) bovine, (vi) porcine, (vii) ovine, (vii) caprine, (ix) equine, and (x) murine.

6. A faucet system comprising:
   a sink comprising a countertop and a sink basin;
   a first faucet;
   a second faucet, wherein the second faucet and the primary faucet are configured to dispense water into a shared drain;
   a timer operatively attached to the valve housing;
   a low flow valve controlling a flow of water through the second faucet, the low flow valve being located within a valve housing that is below the countertop;
   a sensor located above the countertop, wherein the sensor is mounted to a mounting bracket, wherein the sensor detects (a) motion, (b) light, (c) sound, (d) heat, and/or (e) a biological or chemical substance;
   a display for communicating information related to at least one water characteristic, wherein the display comprises at least one touch-sensitive input device;
   a water supply line that supplies a flow of water from at least one upstream location that is below the sink basin to the auxiliary faucet, wherein the water supply line splits three ways into an auxiliary water supply line, a hot water supply line, and a cold water supply line, and such that the water supply line parallelly and fluidly connects to the primary faucet and the auxiliary faucet, wherein the mounting bracket further fastens to the auxiliary water supply line by way of a fastener; and
   a wire that extends through the mounting bracket and provides power between the low flow valve and the sensor;
   wherein the faucet system retains an ability to dispense water from the first faucet;
   wherein said second faucet and said first faucet attach separately to a countertop of the faucet system and stand alone with respect to one another;
   wherein the low flow valve incrementally decreases a flow rate until a set time of the timer elapses and the flow rate reaches zero, and further wherein the flow of water is transported from the auxiliary faucet so that the flow of water can further be delivered to the non-human animal for the set time elapses.

7. The faucet system of claim 6 further comprising a manual shut off and a garbage disposal.

8. The faucet system of claim 6 wherein the sink is a porcelain sink.

9. The faucet system of claim 6 wherein the at least one water characteristic comprises:
   (a) a temperature;
   (b) a flow rate; and/or
   (c) a duration of time for which water is dispensed.

10. The faucet system of claim 9 further comprising:
    a non-transitory computer readable medium comprising a memory, an operating system, and a compiler,
       said non-transitory computer readable medium capable of executing a software application for regulating the flow of water with the low flow valve; and
    a transmitter for communicating data related to the at least one water characteristic to a remote computer system.

\* \* \* \* \*